United States Patent [19]

Ardell et al.

[11] Patent Number: 4,956,426
[45] Date of Patent: Sep. 11, 1990

[54] PROCESS FOR CONTROLLED POLYMERIZATION OF STEREOSPECIFIC ALPHA-OLEFINS HAVING PRESELECTED ISOTACTICITY

[75] Inventors: George G. Ardell, South Charleston, W. Va.; Reginald W. Geck, Victoria, Tex.; John M. Jenkins, III; William G. Sheard, both of South Charleston, W. Va.

[73] Assignee: Union Carbide Chemicals and Plastics Company Inc., Danbury, Conn.

[21] Appl. No.: 889,799

[22] Filed: Jul. 24, 1986

[51] Int. Cl.$^5$ .......................... C08F 2/34; C08F 10/06
[52] U.S. Cl. ........................................ 526/60; 526/59; 526/901
[58] Field of Search ...................... 526/59, 60, 61, 351

[56] References Cited

U.S. PATENT DOCUMENTS

3,594,559 7/1971 Pemberton ............................ 526/60
4,563,512 1/1986 Goodall ............................... 526/351

Primary Examiner—Edward J. Smith
Attorney, Agent, or Firm—Clement J. Vicari

[57] ABSTRACT

A method and system for regulating the isotacticity of polypropylene in a continuous process for manufacturing polypropylene by the polymerization of alpha-olefins in a fluidized bed reactor system using a model which correlates isotacticity values to catalyst productivity values. A catalyst productivity target value is computed using the model based upon a selected xylene solubles or isotactic index. The instantaneous catalyst productivity of the system is then determined by dividing product production rate by catalyst flow rate which is then compared to the catalyst productivity target value. When the comparison between the instantaneous catalyst productivity value and the catalyst productivity differ the molar feed ratio of SCA to alkyl is automatically adjusted until the catalyst productivity, and hence isotacticity, is changed approaching the target values.

4 Claims, 5 Drawing Sheets

PROCESS FOR CONTROLLED POLYMERIZATION OF STEREOSPECIFIC ALPHA-OLEFINS HAVING PRESELECTED ISOTACTICITY

BACKGROUND OF THE INVENTION

1. Field of the Invention

This invention relates to a process for the controlled polymerization of stereospecific alpha-olefins having a preselected isotacticity.

2. Description of Art

Polypropylene manufacturing processes typically involve the polymerization of propylene monomer with an organometallic catalyst of the Ziegler-Natta type. The Ziegler-Natta type catalysts polymerize the propylene monomer by an anionic coordination mechanism to produce solid, crystalline polypropylene. Many desirable product properties, such as strength and durability, depend on the crystallinity of the polypropylene, which in turn is dependent on the stereospecific arrangement of methyl groups on the polymer backbone. A form of the polymer in which the methyl groups are aligned on the same side of the polymer chain is known as isotactic polypropylene, as opposed to atactic polypropylene in which the methyl groups are randomly positioned.

In earlier processes, the polymerization has been conducted in the presence of inert diluents, such as heptane or xylene. Catalyst and liquified propylene are fed into the diluent and the resulting reaction produces polymer granules which form a slurry with the diluent. After reaction, the polymer has to be freed from excess diluent and propylene monomer and washed to remove residual catalyst and atactic material. Subsequent processes have eliminated the diluent by using both liquefied propylene as a slurry medium and more active, stereospecific catalysts. Development of more highly active catalyst systems has further reduced the necessity for, and in many cases allowed elimination of, the washing-drying steps.

Recent processes have eliminated diluents and slurry media by conducting propylene polymerization in the gas phase in stirred or fluidized bed reactors. Highly active, stereospecific catalysts are now commonly used and catalysts with productivities of over 30 kg of resin per gram of catalyst and selectivities of greater than 97% isotactic polypropylene have been developed. These catalysts can substantially eliminate the need for catalyst residue and atactic polypropylene removal steps.

Catalytic components that have been employed in the industrial manufacture of alpha-olefin polymers such as propylene, butene-1, etc., include a solid component comprising at least magnesium, titanium and chlorine and an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component a selectivity control agent.

For convenience of reference, the solid titaniumcontaining constituent of such catalysts is referred to herein as the "catalyst". The organoaluminum compound, whether used separately or partially or totally complexed with a selectivity control agent, is referred to herein as the "cocatalyst" or "alkyl." The selectivity control agent compound, whether used separately or partially or totally complexed with the organoaluminum compound, is referred to herein as the "SCA".

Supported coordination catalysts of this type are disclosed in numerous patents. See, for example, U.S. Pat. Nos. 4,226,741; 4,329,253 and published European patent application No. 19,330. Catalyst systems of this type which have been disclosed in the prior art generally are able to produce olefin polymers in high yield and, in the case of catalysts for polymerization of propylene or higher alpha-olefins, with high selectivity to stereoregular polymer.

The objective of workers in this art is to provide catalyst systems which exhibit sufficiently high activity to permit the production of polyolefins in such high yield as to obviate the necessity of extracting residual catalyst components. In the case of propylene and higher olefins, an equally important objective is to provide catalyst systems of sufficiently high selectivity toward isotactic stereoregular products to obviate the necessity of extracting atactic polymer components. Further, it is important that the resulting poly(alpha olefin) have other acceptable properties such as a melt flow index between between 0.1 and 1000. "Melt flow index" may be defined as the number of grams of polymer resin at 230° C. that can be forced through a 2.0955 mm orifice in 10 minutes by a 2160 gram force.

Although many chemical combinations provide active catalyst systems, practical considerations have led workers in the art to concentrate on certain preferred components. The solid component of the catalyst typically comprises magnesium chloride, titanium chloride (generally in tetravalent form) and, as an electron donor, an aromatic ester such as ethyl benzoate or ethyl p-toluate. The cocatalyst typically is an aluminum trialkyl such as aluminum triethyl or aluminum tri-isobutyl, often used at least partially complexed with a selectivity control agent or agents. The selectivity control agent typically is an aromatic ester such as ethyl-paramethoxybenzoate (ethyl anisate).

Catalysts for the manufacture of stereospecific alpha-olefin polymers include those described in U.S. Pat. Nos. 4,442,225 to Takitani et al.; 4,563,512 to Goodall; 4,414,132 to Goodall et al.; 4,483,966 to Suzuki et al.; and 3,112,300 and 3,112,301 to Natta et al.

In a continuous reaction system, the reaction mixture is typically maintained at conditions at which the polymer is produced as a slurry of powder in the reaction mixture. Use of highly active and highly stereospecific catalyst systems in propylene polymerization substantially eliminates the need to remove catalyst components or atactic polymer from the polymer product. The mixture of other components fed continuously or at frequent intervals into the reactor system must be monitored so as to ensure an efficient reaction and the desired product. For example, it is well known that supported coordination catalysts and catalyst systems of the type described above are highly sensitive, in varying degrees, to catalyst poisons such as water, oxygen, carbon oxides, acetylenic compounds and sulfur compounds.

The total amount of aluminum alkyl compounds in the polymerization reaction mixture is generally in the range from 10 to 200, and in most cases between 30 and 130, moles per atom of titanium in the catalyst. Differently prepared catalysts vary in the Al:Ti ratio required for best results as will be known to persons familiar with this type of catalyst. In general, activity may be greater at higher Al:Ti ratios, but this results in undesirable higher aluminum residues in the polymer; it also tends to increase the requirement of selectivity control agent in order to maintain the desired degree of isotacticity of the product. The desired balance of concentration of catalyst components generally has been determined empirically.

It is generally possible to control catalyst productivity and product isotacticity within limits, by adjusting the molar feed ratio of alkyl to selectivity control agent (SCA). Increasing the amount of SCA increases selectivity to isotactic or stereoregular polymer, but may reduce activity, and hence catalyst productivity. Attempts have been made to monitor the selectivity of the process to the manufacture of isotactic polypropylene by directly measuring the Isotactic Index (II) or the Xylene Solubles (XS) of the polypropylene product.

Selectivity to isotactic polypropylene is typically determined under the XS test by measuring the amount of polypropylene materials which are xylene soluble, in accordance with regulations of the U.S. Food and Drug Administration. The XS test is carried out as follows: A sample product of the propylene polymerization process is completely dissolved in xylene, which contains oxidation inhibitor, in a stirred flask by heating under reflux at 140° C. The flask then is immersed in a water bath at 25° C. without stirring for one hour, during which the insoluble portion precipitates. The precipitate is filtered off and the solubles present in the filtrate are determined by evaporating a 100 ml aliquot of the filtrate, drying the residue under vacuum, and weighing the residue. The xylene-solubles consist of amorphous material with some low molecular weight crystalline material (FDA regulations 121.2501 and 121.2510, 1971).

The Isotactic Index (II), on the other hand, measures the amount of polypropylene material insoluble in n-heptane. Although the two tests, XS and II, are generally run using different solvents, they generate results which are predictably related since one test (XS) measures insolubility while the other (II) measures solubility. The Xylene Solubles of polypropylene is related to the Isotactic Index by the relationship $XS\% = 63.2 - 0.629\ (II\%)$.

Although both XS and II can thus be measured directly using known laboratory sampling techniques, and the reaction adjusted accordingly to obtain optimum isotacticity, such tests ordinarily require a relatively long time to run, on the order of six to eight hours for XS and on the order of six to 24 hours for II. In systems of the prior art, the catalytic process can thus be producing polypropylene not having the desired isotacticity during the long testing periods. Furthermore, in these prior art systems, awaiting the results of adjustments to the reaction will require additional time as the II or XS tests must be run again once corrections have been made. Thus, many hours can go by awaiting XS and II test results during which time large quantities of unacceptable or non-optimum resins may be produced.

SUMMARY OF THE INVENTION

1. Objects of the Invention

It is therefore an object of the invention to provide a method and system for controlling process variables so as to produce polypropylene having a desired isotacticity.

It is a further object of the invention to provide a method and system for controlling polypropylene isotacticity which provides both "real time" indications of product isotacticity and allows real-time control of the polymerization process 2. Brief Description of the Invention These and other objects of the invention are met by providing a method and system for controlling and maintaining relatively constant the desired isotacticity of polypropylene Product of a reactor system. A model which correlates isotacticity values to catalyst productivity values is first generated from empirical data of a reaction system. A particular catalyst productivity target value is then calculated from the model corresponding to a desired level of isotacticity selected for the product. The instantaneous catalyst productivity of the system is then determined and compared to the catalyst productivity target value. When the comparison between the instantaneous catalyst productivity value and the catalyst productivity target value indicates that the desired isotacticity for the polypropylene product will not be achieved, process operating variables are adjusted to move catalyst productivity, and hence isotacticity, to the target values. In one embodiment, catalyst productivity is calculated by dividing production rate by catalyst flow rate and adjustments to catalyst productivity are made by varying the molar feed ratio of aluminum- alkyl ("alkyl") to SCA.

The invention may be applied in reaction systems wherein the catalyst exhibits a predictable, i.e., relatively fixed relationship between catalyst productivity and the isotacticity of the polymer product.

In a preferred embodiment, a control computer monitors system conditions and performs the necessary calculations and computerized feedback control is employed to implement the adjustments Preferably, results of actual laboratory product analysis will be used to periodically calibrate the model.

BRIEF DESCRIPTION OF THE DRAWINGS

The invention will be described in greater detail below by way of reference of the following drawings, in which.

DETAILED DESCRIPTION OF THE DRAWINGS

The invention may be readily embodied in a wide variety of polypropylene reactor systems. For example, the invention may be embodied in gas phase stirred reactors; in liquid phase slurry reactors where liquified propylene is used as a diluent; in liquid phase reactors using an inert diluent; and in gas phase fluidized bed reactors. The reaction catalyst in embodiments of the invention should, however, exhibit a direct relationship between catalyst productivity and isotacticity.

Figure 1:
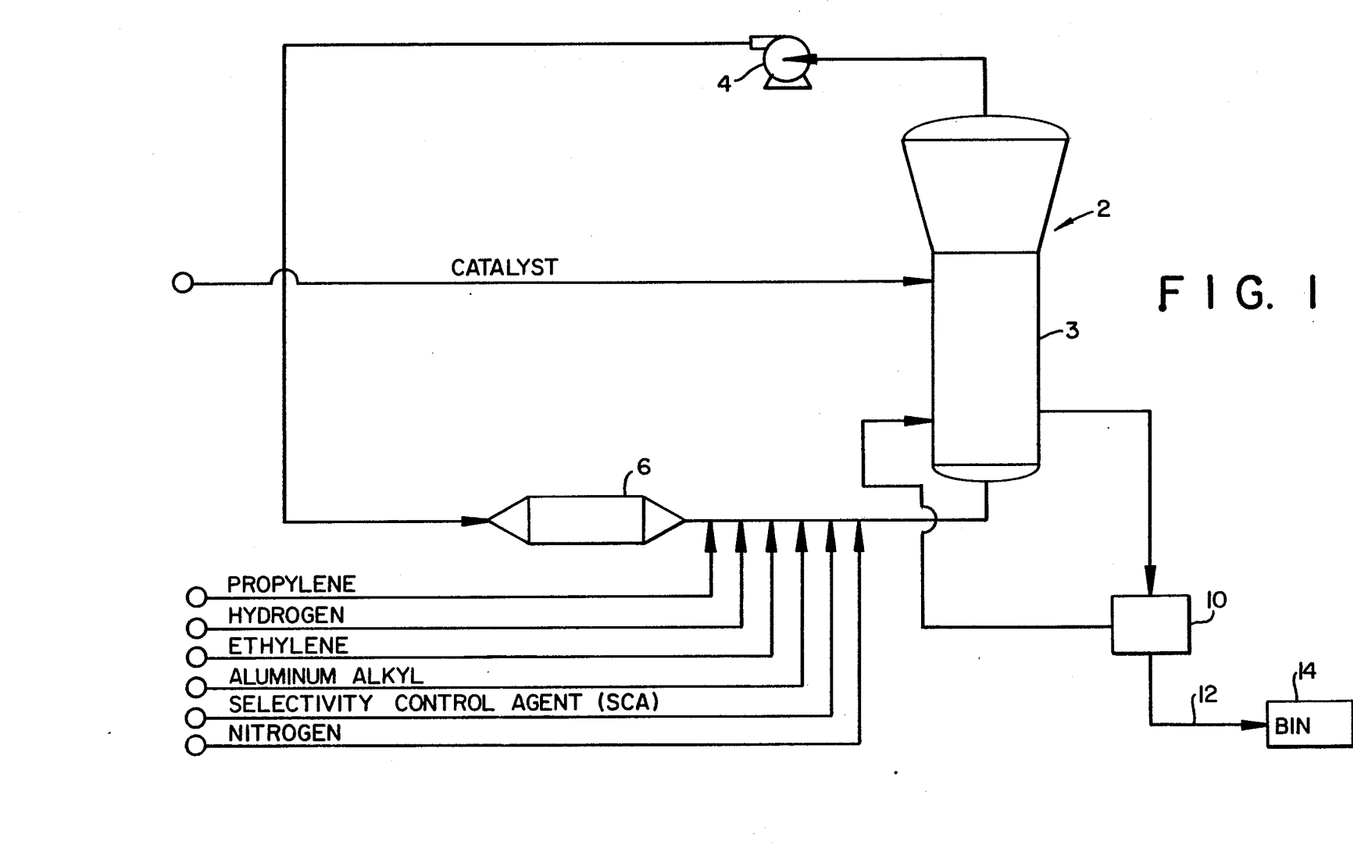
FIG. 1 is a schematic drawing of a catalytic reactor system.

One example of a fluidized-bed reactor system of the type wherein the invention may be embodied is illustrated by way of reference to FIG. 1. In such systems, a polymerization reaction takes place in a fluidized bed reactor 2. The reactor houses a fluidized bed 3 of solid, granular polypropylene resin produced during the reaction process.

In the system of FIG. 1, gaseous reactants, which may be a mixture of propylene, hydrogen, nitrogen, ethylene, and/or other alpha-olefins, are continuously recycled through the reactor by a cycle gas compressor 4. The cycle gas flows through the resin bed within reactor 2, fluidizing the bed and removing the heat of polymerization. Catalyst and cocatalysts such as aluminum alkyl and a selectivity control agent (SCA) are likewise fed to the reactor.

In the embodiment of FIG. 1, heat of polymerization and heat of compression are removed from the cycle gas by a cycle gas cooler 6. The reaction temperature may also be controlled by known methods such as by adjusting water flow in a cooling system (not shown in FIG. 1) which removes heat from the circulating gaseous raw material stream via the cycle gas cooler 6.

Solid product in the form of polypropylene resin is intermittently removed from the fluidized bed reactor 2 and flows to a product discharge system 10. In the discharge system 10, reactor gases are separated from the solid resin. The product resin then may be transported by a conveying system 12 to either a purge bin 14 or to a second reactor (not shown) for further processing.

As stated above, polypropylene product quality may be specified in terms of a known solid resin property called isotacticity The well-known xylene solubles (XS) and isotactic index (II) techniques provide means for measuring isotacticity However, as likewise stated above, XS and II are not directly measurable by any practicable on-line technique, but must, instead, be measured by time consuming laboratory analysis of product samples periodically drawn from discharged product.

The invention provides a method and system for monitoring and maintaining the isotacticity of polypropylene product within specific limits with-out the need for continuously, directly measuring either the XS or II level of the product Rather than relying solely on frequent and time-consuming XS or II measurements to determine isotacticity, the invention utilizes on-line computational techniques which predict isotacticity from catalyst productivity ("CP") based upon a model of the relationship between CP and isotacticity drawn from empirical data of a given installation.

Unlike isotacticity, CP is quickly calculated based on readily ascertained process conditions. Catalyst productivity may, for example, be calculated by dividing production rate by catalyst flow. Thus, with the invention, a calculated CP is compared with a "target" CP (set knowing the desired isotacticity level to which the target relates) to provide a user or a system control computer with information as to whether the calculated CP value is "on-target" (equal to the target CP) or "off-target" (not equal to the target CP) for the purpose of producing desired isotacticity. If the calculated CP value is off-target, the reaction can be adjusted by varying process control conditions, such as SCA and alkyl flow rates to the reactor, to attain desired isotacticity levels.

A preferred method of practicing the invention thus involves the following steps (note that the invention will only be operable for those catalysts and catalyst systems where there is a relationship between isotacticity and catalyst productivity)

I. The relationship between process operating conditions (catalyst productivity) and isotacticity is mathematically modelled for the individual catalyst system by, for example, taking empirical data from the system and applying well-known regression analysis and best fit methodology to generate the model. Examples of such models will be discussed below by way of reference to FIGS. 4 and 5. The model will preferably be either stored in an electronic memory device or incorporated into computer software logic.

II. The effect of changing other process variables or conditions (e.g., reactor temperature) which affect the final properties of the product are determined empirically, modelled and electronically stored for later use in adjusting reactor conditions.

III. An isotacticity target is established based upon production requirements. A catalyst productivity target may then be set based upon the isotacticity target from the equation of step I IV. Instantaneous catalyst productivity is calculated based on on-line measurements. One method of determining catalyst productivity is to divide production rate by catalyst flow rate.

V. The current values of product isotacticity are then predicted (calculated) by the relationship modelled in step I according to calculated catalyst productivity and other operating variables such as reactor temperature.

VI. Using the predicted current isotacticity property value of step IV as if it was a directly measured value, the predicted isotacticity is compared to the target isotacticity of step III. Optionally, the calculated CP of step IV can be compared to the target CP of step III without the necessity of conducting step V. If the the calculated CP or XS value is off-target, the reactor conditions can then be adjusted to obtain the desired catalyst productivity and isotacticity level. One method of adjusting reactor conditions is to vary the molar feed ratio of alkyl to SCA. Generally, if the calculated CP indicates the isotacticity is low, the SCA would be increased or the alkyl would be decreased.

VII. If desired, predicted isotacticity levels can be periodically compared with actual laboratory measured product property values and the results of the comparison can be used to "correct" the model relationship.

VIII. Steps IV through VII are repeated while the product requirements remain as set in step III.

In general, a catalyst productivity versus isotacticity model can be generated for purposes of the invention by repeatedly taking product samples from the reactor; recording instantaneous catalyst productivity data (such as catalyst flow and production rate) and other process condition data (such as reactor temperature and dew point) at the time of sample removal; running an XS or II test on the extracted samples; matching the results of the XS or II tests to the conditions which existed at the time the samples were taken; and inputting the isotacticity results of a statistically sufficient number of samples and the corresponding process conditions to a regression analysis computer Program which will output a system model. A typical regression analysis routine will allow X and Y coordinates to be chosen such that CP can be related to XS or II in the output model while constant terms can be specified to reflect other process conditions, such as reactor temperature and dew point.

Figure 4:
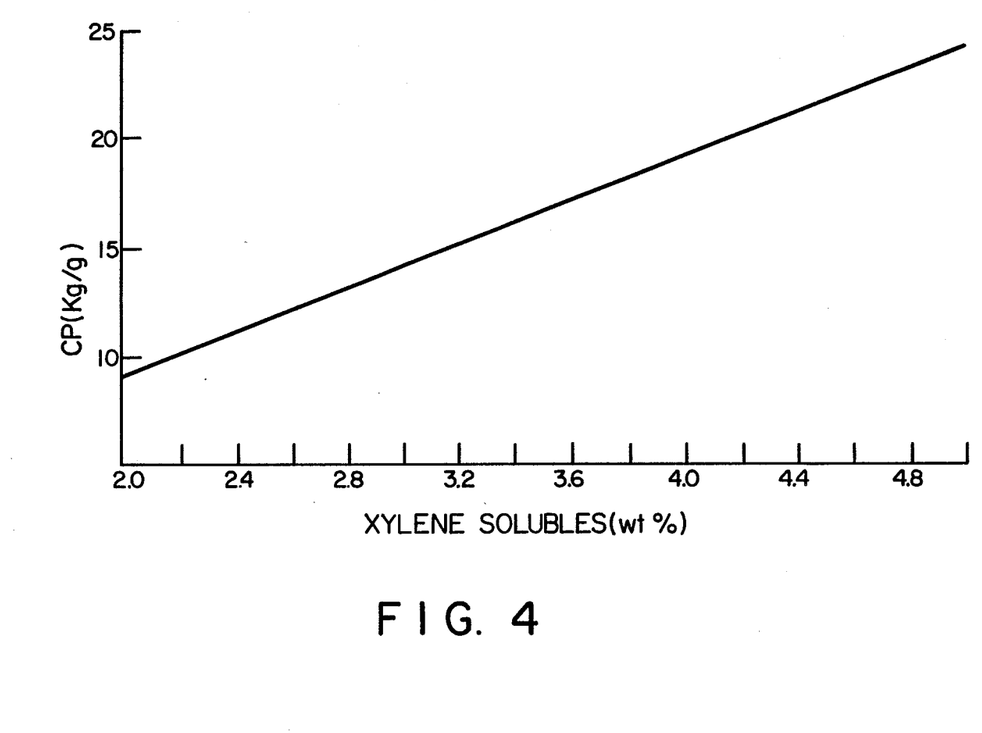
FIG. 4 is a graphic representation of isotacticity, in terms of xylene solubles, versus catalyst productivity for a known catalyst.
Figure 5:
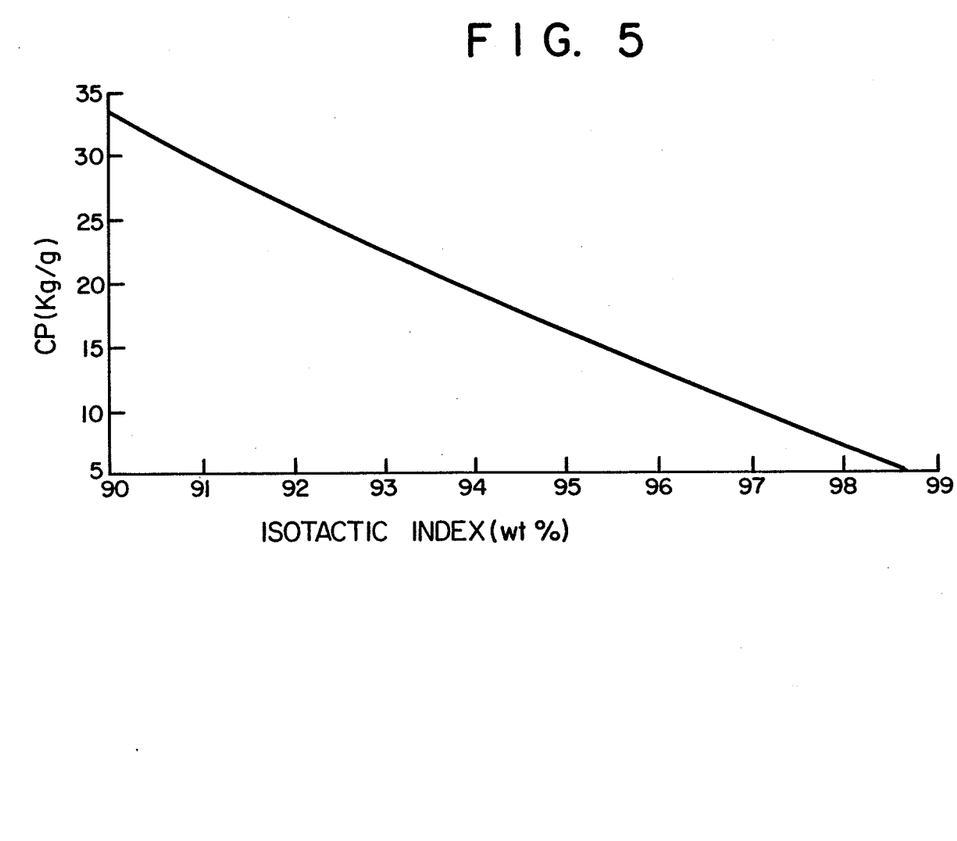
FIG. 5 is a graphic representation of isotacticity, in terms of isotactic index, versus catalyst productivity for a known catalyst.

One example of such a model relationship between catalyst productivity and isotacticity for a known Ziegler-type titanium catalyst is illustrated by way of reference to FIG. 4. The model of FIG. 4 relates catalyst productivity to isotacticity expressed in terms of xylene solubles (XS). Alternatively, the model of FIG. 4 could be expressed in terms of isotactic index (II). Such a relationship relating CP to II is illustrated in FIG. 5.

FIG. 4, which was developed from empirical data relating catalyst productivity to residual resin titanium by using a well-known regression analysis technique to find the "best fit" of the data, represents a model which may be used to predict a particular isotacticity level (expressed along the X-axis in terms of percentage of xylene solubles) based on a calculable catalyst productivity value (expressed along the Y-axis in terms of Kg of product per gram of catalyst).

More particularly, the model or equation illustrated in FIG. 4 may be expressed mathematically for constant reactor temperatures and propylene partial pressure as follows:

$$CP = a/(b/XS + c(Rx) + d) \quad (1)$$

where
CP = Catalyst productivity in terms of kg resin/g catalyst
XS = Xylene solubles, %
Rx = Reactor temperature, °C
a, b, c, d = Catalyst and system dependent constants A more detailed description of the model of FIG. 4 is described below in the Example.

Many types of formulas or models and many variations of the above equation may, of course, be provided within the scope of the invention. For example, the terms of particular models will likely vary between installations depending upon the particular type of reactor system and catalyst used at the installation. It would, for example, be doubtlessly expected that the coefficients and constants a–d of equation (1) would vary from installation to installation.

A more generalized form of model equation within the invention relates CP as a function of XS:

$$CP = f(XS)$$

As stated above, however, not all catalysts will exhibit a substantial relationship between CP and isotacticity and the invention would find lessened utility in such catalyst systems.

Figure 2:
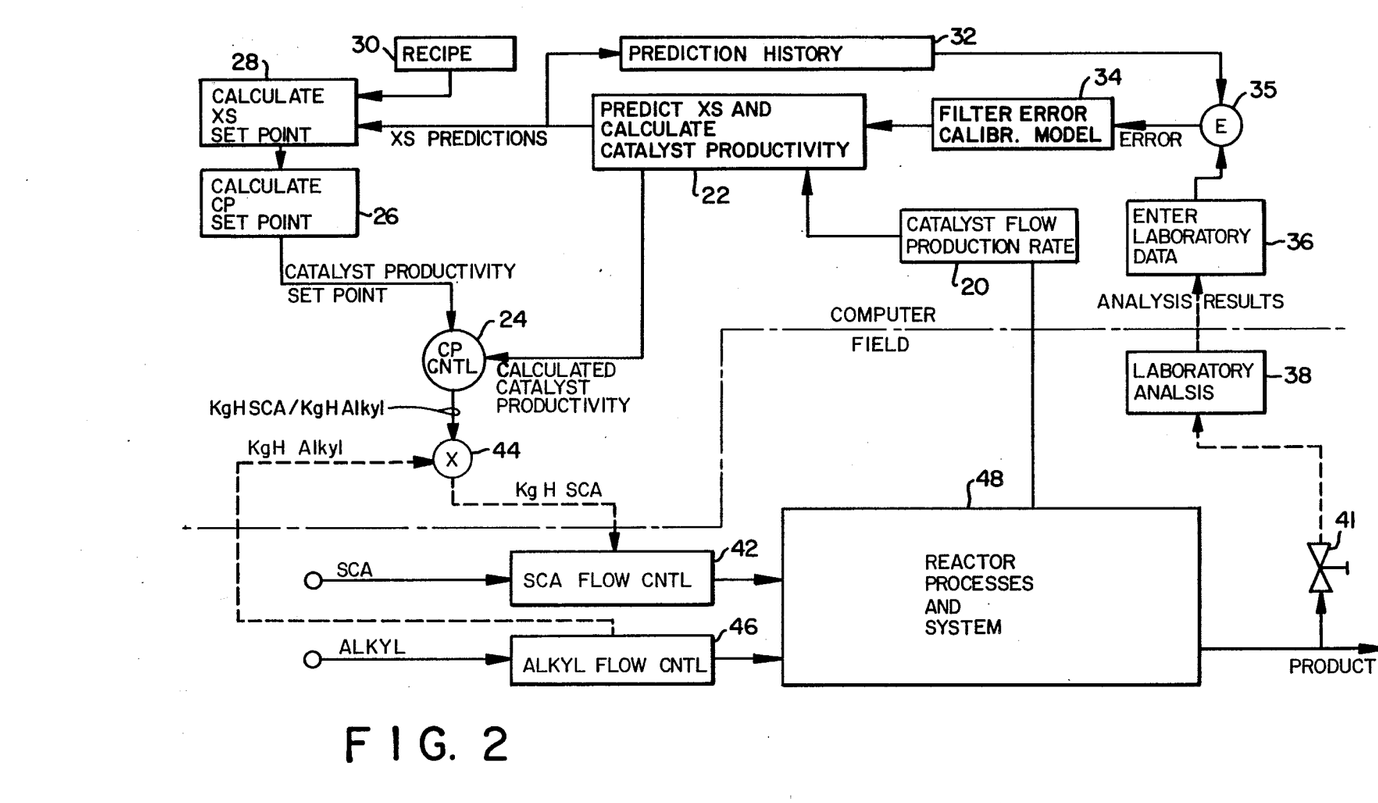
FIG. 2 is a schematic diagram of a reactor predictive control system according to the invention.

FIG. 2 is a schematic diagram of a xylene solubles prediction/control system according to the invention, including schema of the reactor processes and instrumentation (FIELD) along with schema of the computer functions (COMPUTER) that are performed. While it is, of course, preferred that the system be computer controlled using either a single control computer or a series of communicating computers, the invention can be implemented without computers, for example, by using hand held calculators to determine isotacticity from catalyst productivity and by manually adjusting reactor conditions.

In the embodiment of FIG. 2, the functions of the system computer COMPUTER include monitoring process conditions such as catalyst flow and production rate 20, and based on this information, calculating catalyst productivity 22 by dividing production rate by catalyst flow. Once catalyst productivity is determined, a predicted XS can be established by solving a model equation such as equation (1) within the computer. In this embodiment, the calculated CP is itself compared within a catalyst productivity control module 24 to a catalyst productivity "set point" or "target" which has been determined at step 26 by solving equation (1) for a desired XS at step 28 based on the reactor recipe 30.

The "recipe" 30 in this embodiment is a permanent file of data stored in the computer which contains pre-established information for producing the desired resin product. In addition to the desired II or XS, the recipe may contain other target resin properties and/or set-points for various reactor operating variables.

If the CP control module 24 determines that instantaneous CP is off-target, it can order adjustments to the Process conditions which determine CP (and hence isotacticity) by varying the molar feed ratio of SCA to alkyl. In the embodiment of FIG. 2, this is done by providing a desired ratio of SCA to alkyl to a multiplier routine 44 which multiplies the desired ratio by the measured alkyl flow rate provided by the alkyl flow controller 46 to provide the SCA flow controller 42 with a new value (in Kg/Hour) for SCA flow. SCA is thus provided at the new flow rate to the reactor system 48. In FIG. 2, KgH refers to Kilograms per hour.

At periodic intervals, measured process conditions, and parameters calculated from the process conditions, are used to predict the XS properties of the polypropylene currently being produced in the reactor (i.e., instantaneous properties) by solving the above formula (1) for XS. The instantaneous (Predicted) XS property value may be combined with a current average property value of the fluidized bed (e.g., by using a simple continuous stirred tank reactor CSTR mixing calculation) to get a "bed average property value". The bed average XS value may be stored in a "history table" 32 along with the operating conditions used to calculate them. The bed values can be used for later comparison with the results of laboratory analysis data 36 for calibration of the model equation at step 34.

The "current" instantaneous property values may be compared with target values specified in the recipe 30. The differences therebetween, are used to calculate (at step 28) a "set point" for the instantaneous XS required to move the bed average XS toward the target value in the base resin recipe. The XS "set point" may then be used with an inverted form of the resin property equation (1) to calculate (at step 26) a set point for catalyst productivity (CP). The CP value may thereafter be used as the set point of the catalyst productivity controller implemented manually, with computer control software or with dedicated micro-circuitry.

The feedback of controlled variable inputs such as production rate and total catalyst flow to the computer provide values to calculate current catalyst productivity. These values may be provided as outputs from separate computer applications that control production rate and/or monitor catalyst flow. One method for calculating production rate is described below by way of reference to FIG. 3.

In the embodiment of FIG. 2, isotacticity is controlled by providing computer control of the SCA/alkyl molar flow ratio A flow controller 42 (FIG. 2) may thus be provided to manipulate the flow of selectivity control agent and to hold the desired SCA/alkyl molar feed ratio.

Preferred embodiments of the invention also provide for periodic refining of the isotacticity/catalyst productivity model. In the embodiment of FIG. 2, samples of the resin being produced are periodically removed from the reaction at outlet 41 and sent to the laboratory 38 for analysis of isotacticity, e.g. II or XS. The results of the analyses are entered into the computer at steP 36 where a history of, for example, the last six prediction results may be maintained in a prediction file history 32 according to time.

When a new laboratory analysis value has been entered for II or XS, the predicted average bed value of the property corresponding to the time the sample was taken may be retrieved from the history table 32 and compared to the laboratory value using a comparison routine 35 to generate an error. The error is preferably filtered by well-known mathematical error filtering techniques at step 34, and the filtered error is then used to calibrate the resin property equation that was used for the prediction. The calibrated equation may then be used to correct all predictions from the time that the sample was taken up to the present and the corresponding adjustments to CP may be made by adjusting the molar feed ratio of SCA/alkyl. In some embodiments, an extra term may be added to the model which can be adjusted for calibration purposes. The adjustments may amount to a calibration of equation intercepts.

In preferred embodiments of the invention, isotacticity control calculations will be done entirely within a computer. The computer can be easily programmed to calculate a target or "set point" for the instantaneous II or XS value that should be produced in order to move the bed average value to the aim conditions given in the recipe 30. Control algorithms may be implemented within the ability of ordinarily skilled programmers for this purpose which have the predicted instantaneous and bed average values as inputs and the target for the instantaneous values as output. The target for the instantaneous II or XS may then be used to compute a set point for the reactor conditions that determine the values of the instantaneous property being produced.

Figure 3:
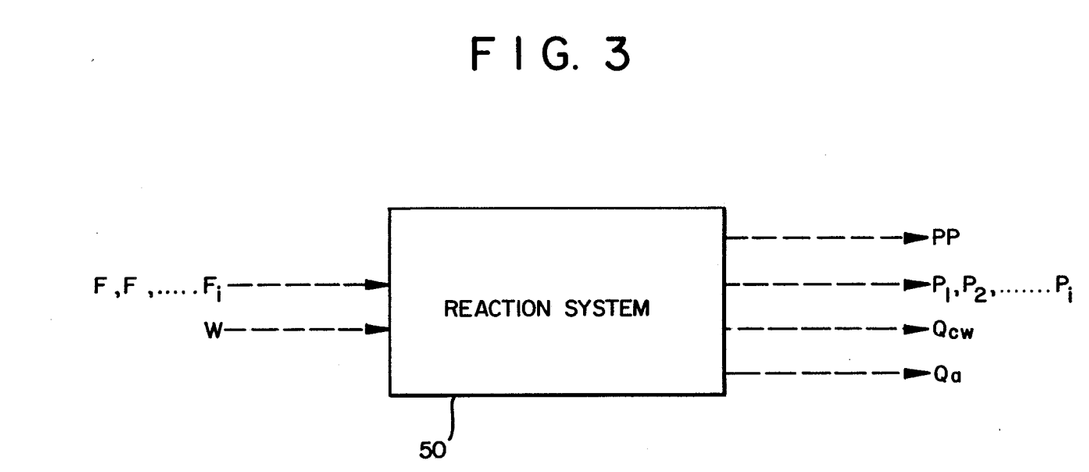
FIG. 3 illustrates a material and energy balance around a reaction system for the purpose of production rate calculation.

As stated above, the production rate within the reactor is measured and used as one factor to calculate catalyst productivity. In a preferred embodiment, production rate is calculated by analyzing the energy balance around an entire reactor system 50 as illustrated in FIG. 3. In FIG. 3,:

$F_1, F_2, \ldots, F_i =$ Flow of feed streams to the reaction system, Kg/hr $PP =$ Flow of polypropylene from the reaction system, Kg/hr $P_1, P_2, \ldots, P_i =$ Flow of other streams leaving the reaction system, Kg/hr $W =$ Energy (work) input to the reaction system by the cycle gas compressor, K.Cal/hr $Q_{cw} =$ Heat removed from the reaction system by cooling water in the cycle gas cooler, K.Cal/hr, and $Q_a =$ Ambient heat losses from the reaction system, K.Cal/hr.

The steady-state energy balance around the system 30 is thus computed as:

$$F_1^*(H_{F1} - H_{F1r}) + F_2^*(H_{F2} - H_{F2r}) + \ldots + F_i^*(H_{Fi} - H_{Fir}) -$$
$$PP^*(H_{pp} - H_{ppr}) - P_1^*(H_{p1} - H_{p1r}) - P_2^*(H_{p2} - H_{p2r}) - \ldots -$$
$$P_i^*(H_{pi} - H_{pir}) + PP^*H_{RX} + W - Q_{cw} - Q_a = 0$$

where:

$H_{xx} =$ Specific enthalpy of the corresponding stream at flowing conditions, K.Cal/Kg $H_{xxr} =$ Specific enthalpy of the corresponding stream at a reference temperature and pressure, K.Cal/Kg, and $H_{RX} =$ Heat of reaction for polypropylene at the reference temperature and pressure, K.Cal/Kg.

Evaluation of the energy balance requires information as to the flow rate and the enthalpy of each stream entering and leaving the reaction cycle, including the resin. The equation can be simplified in some embodiments if the reference condition for enthalpy is selected to be identical with reactor bed conditions. When this is done, the flowing conditions and the reference conditions become identical for the resin and for all other streams leaving the reaction system, so the difference between flowing enthalpy and reference enthalpy becomes zero. Making this assumption, and solving for resin production rate gives the following equation:

$$PP = [Q_{cw} + Q_a - W - F_1^*(H_{F1r}) - H_{F1r}) - F_2^*(H_{F2r} - H_{F2r}) - \ldots - F_i^*(H_{Fi} - H_{Fir})]/H_{RX}$$

This expression for production rate may be evaluated using measured compositions, flows, temperatures, and pressures from the reaction system and by evaluating stream enthalpies using an appropriate equation of state.

Likewise, the material balance around the system is:

$$F_1 + F_2 + \ldots + F_i - PP - P_1 - P_2 - \ldots - P_i = dW/dt$$

where:

$W =$ total weight of material in the reaction system (inventory), Kg, and $dW/dt =$ The rate of change of system inventory, Kg/hr.

Solving for production rate gives:

$$PP = F_1 + F_2 + \ldots + F_i - P_1 - P_2 - \ldots - P_i + dW/dt$$

This expression for production rate may also be evaluated using measured data from the reaction system.

In addition to the above indirect methods of generating production rate, a more direct approach of simply measuring the rate of resin flow leaving the reaction system may be used. The rate of flow of the granular material may be measured by any of a number of methods which are well known to those skilled in the art.

Production rate may be calculated by either a separate computer or the system control computer. In either case, the computer may monitor either the heat removed by the cooling water, the quantity of product discharge from the reactor, or the material balance in the reaction system. From the data collected and from specified process operational and/or geometric parameters, the computer calculates the current production rate in the fluidized bed.

The computer also monitors the catalyst feeder to determine how much, if any, catalyst is being fed to the reactor. A catalyst flow meter may be used to calculate catalyst flow. In one embodiment, a computer program calculates the catalyst flow rate based on changes in position of a catalyst flow piston meter. The instantaneous flow rate data is provided to the computer at step 20 for use in calculating catalyst productivity.

EXAMPLE

A UNIPOL (trademark of Union Carbide Corporation) fluidized bed reactor using a commercial catalyst of Shell Chemical Company, SHAC-103, was operated with the xylene solubles of the product controlled by the invention described herein. A relationship between catalyst productivity and xylene solubles was first determined by pilot plant experimental studies in which data obtained was analyzed by a statistical procedure called multiple linear regression. (*Introduction to Statistical Analysis*, Dixon and Massey, Edition III, 1969). This procedure enabled the determination of the constants in an equation similar to that described above (equation (1)). For this particular catalyst, the relationship obtain was:

$$CP = [30.0/(6.897/XS + 0.69(Rx - DP) - 0.10(Rx) + 6.25)](P_{c3}/390.0) \quad (2)$$

Where:
CP = Catalyst Productivity (Kg resin/g catalyst)
XS = Xylene Solubles (%)
Rx = Reactor Temperature (°C.)
DP = Reactor Gas Dew Point (°C.)
$P_{c3}$ = propylene Partial Pressure (p.s.i.a.).

This relationship was inputed to the computer as the system model. When a product having a particular XS percentage was heeded to be produced at defined conditions of Rx-DP, Rx and propylene partial pressure, the CP would be calculated for that product. If the reactor was run at this CP set point, then the required product would be expected to be produced. If the CP differed from this value, then the computer would send signals to the SCA flow controller to automatically adjust the feed rate of the SCA to thereby alter the molar feed ratio of alky to SCA. Thus the reactor was operated with very little variations in the xylene solubles of the product, thereby avoiding the production of out of specification material as would occur if it was necessary to wait for laboratory xylene solubles analysis of produced resin.

The relationship of equation (2) above is shown in FIG. 4 for the case where Rx=65° C., Rx−Dp=1.5° C. and $P_{c3}$=390 p.s.i.a. This relationship can also be expressed in the form of isotactic index by substitution of the following relationship:

$$XS\% = 63.2 - 0.629\ (II\%)$$

The model relationship between catalyst productivity and isotacticity in terms of the Isotactic Index (II) is shown in FIG. 5 for the values of Rx, Rx−DP and $P_{c3}$ discussed above.

Thus, according to both process and system aspects of applicants' invention, the isotacticity of polypropylene product of a reactor system is predicted based upon catalyst productivity by using a model which relates isotacticity to catalyst productivity. The predicted isotacticity value of the Polypropylene being produced (i.e. the instantaneous value) is adjusted in order to control the average isotacticity of the discharged product (bed average value). Thereafter, the model used to predict isotacticity using the results from laboratory analysis of resin samples may be corrected or recalibrated. Errors between predicted and measured values may then be used to correct previous average property predictions. The invention is therefore useful in maintaining product isotacticity within preselected limits.

Although the invention has been described in detail above by way of reference to the accompanying drawings, it should be understood that the invention is not limited to the embodiments herein described but should be interpreted only in accordance with the claims which follow.

What is claimed is:

1. A continuous process for the polymerization of propylene monomer in a fluidized bed reactor system using a catalyst having a predictable relationship between catalyst productivity and isotacticity, a cocatalyst including aluminum alkyl and a selectivity control agent (SCA) wherein the polypropylene isotacticity of the polypropylene product from the reactor system is regulated to a relatively constant value within a preselected range to provide optimum isotacticity comprising the steps of:

(a) formulating a model of the characteristic relationship between catalyst productivity and the isotacticity of the polypropylene product produced in the reactor system;
   (b) selecting a target catalyst productivity value from the model based on a preselected isotacticity level for the polypropylene product within said preselected range;
   (c) monitoring the catalyst flow rate to the reactor;
   (d) calculating the instantaneous production rate of polypropylene in the reactor system from energy data from the reactor;
   (e) computing an instantaneous value of catalyst productivity by dividing the instantaneous production rate from step (d) with the catalyst flow rate from step (c);
   (f) comparing the computed instantaneous value of catalyst productivity from step (e) with the target value of step (b); and
   (g) adjusting the molar feed ratio of the catalyst components SCA to alkyl when the comparison of step (f) shows a difference to cause the instantaneous value of catalyst productivity to change n the direction toward the target value.

2. A process as claimed in claim 1 further comprising the steps of:

(h) predicting an instantaneous percentage of xylene solubles from the instantaneous catalyst productivity of step (e) by solving an equation correlating catalyst productivity to xylene solubles as follows:

$$Cp = a/(b/XS + c(Rx) + d)$$

Where
   Cp = Catalyst productivity
   XS = Xylene Solubles
   Rx = Reactor temperature
   a,b,c,d = Catalyst and reactor system dependent constants;

(i) averaging the instantaneous predicted value of xylene solubles to realize an average value of xylene solubles in the reactor;
   (j) comparing the average computed value of xylene solubles with a recipe value of xylene solubles from a file of stored data of xylene solubles under similar process conditions;
   (k) computing a new target catalyst productivity value using the equation of step (h) based upon the recipe value and the difference between the recipe value and the average value of xylene solubles; and
   (l) substituting the new target catalyst productivity value for the selected target catalyst value in step (b).

3. A process as claimed in claim 2 wherein the isotactic index is used in place of xylene solubles in following the steps (h) to (l) by modifying the model in accordance with the relationship $$XS\% = 63.2 - 0.629\ II\%$$

Where II = isotactic index.

4. A process according to claim 1 or 2 further comprising the steps of:
   m. periodically measuring the physical isotacticity of sample of the polypropylene product removed from the reactor;
   n. comparing the measured isotacticity of said sample with a predicted isotacticity value for said sample calculated in accordance with the following equation:

$$CP = [cI + d(Rx - DP) + e(RX) + f]*g(PP)$$

where CP equals catalyst productivity from step (e), Rx equals reactor temperature, DP equals reactor dew point temperature, I equals predicted isotacticity, PP equals propylene partial pressure and c, d, e, f and g are constants;
   o. when there is a difference between the measured isotacticity value for said sample and the predicted isotacticity value for said sample, modifying the equation constants to satisfy said difference;
   p. using the modified equation as the model in step (a); and
   q. setting a new target catalyst productivity based on the new model equation.

* * * * *